(12) United States Patent
Brown et al.

(10) Patent No.: US 7,073,052 B2
(45) Date of Patent: Jul. 4, 2006

(54) METHOD AND SYSTEM FOR STORING ACTIVE FILES AND PROGRAMS IN A HIBERNATION MODE

(75) Inventors: Joe Nathan Brown, Austin, TX (US); Philip Bernard Burkes, Round Rock, TX (US); Victor Espinoza, Jr., Pflugerville, TX (US); Larry A. Michel, Austin, TX (US)

(73) Assignee: International Business Machines Corporation, Austin, TX (US)

( * ) Notice: Subject to any disclaimer, the term of this patent is extended or adjusted under 35 U.S.C. 154(b) by 546 days.

(21) Appl. No.: 10/443,691

(22) Filed: May 22, 2003

(65) Prior Publication Data

US 2004/0236974 A1   Nov. 25, 2004

(51) Int. Cl.
*G06F 15/177* (2006.01)
(52) U.S. Cl. .............................. 713/1; 713/2
(58) Field of Classification Search ............ 713/1, 713/2
See application file for complete search history.

(56) References Cited

U.S. PATENT DOCUMENTS

| | | | |
|---|---|---|---|
| 5,812,821 A | 9/1998 | Sugi | |
| 5,920,728 A | 7/1999 | Hallowell | |
| 6,101,601 A * | 8/2000 | Matthews et al. | 713/2 |
| 6,209,088 B1 | 3/2001 | Reneris | |
| 6,385,721 B1 * | 5/2002 | Puckette | 713/2 |
| 6,438,708 B1 | 8/2002 | Shinichi | |
| 6,487,718 B1 * | 11/2002 | Rodriguez et al. | 717/177 |
| 6,954,852 B1 * | 10/2005 | Burokas et al. | 713/2 |
| 2003/0200290 A1 * | 10/2003 | Zimmerman et al. | 709/222 |

FOREIGN PATENT DOCUMENTS

| | | |
|---|---|---|
| EP | 0636980 A1 | 2/1995 |
| EP | 0658843 A1 | 6/1995 |

* cited by examiner

*Primary Examiner*—Chun Cao
(74) *Attorney, Agent, or Firm*—Janis E. Clements

(57) ABSTRACT

Advanced computer hibernation functions are useful in saving a user's work environment when a user logs off a computer. The current art requires powering off the computer when entering into hibernation, and only allows a user to store a single non-reusable hibernation file for use in restoring operation when the computer is subsequently powered on. The present invention allows hibernation files to be created and stored without requiring a user to power off the computer to enter hibernation mode. Once the hibernation files are created and stored, a user achieves faster shut down of the computer when the user enters into hibernation mode by selecting from one of the existing hibernation files for advanced hibernation mode. Multiple users are allowed to save multiple work environments or files while maintaining privacy regarding each user's work environments by requiring log on identification passwords for each user.

20 Claims, 7 Drawing Sheets

METHOD AND SYSTEM FOR STORING ACTIVE FILES AND PROGRAMS IN A HIBERNATION MODE

TECHNICAL FIELD

The present invention relates to extending the hibernation settings of a computer using an operating system (OS) and particularly to functions in the basic input/output system (BIOS) and OS that allow a user to save and restore multiple hibernation files to selectively restore different work environments based on user ID while the computer is already up and running.

BACKGROUND OF RELATED ART

In the current art relating to computer hibernation functions, a single non-reusable hibernation file can be stored which the computer will use to restore operation when the computer is subsequently powered on. Presently, a user cannot restore different work scenarios, such as word processing or multiple concurrent applications, needed by the user to perform at various times and/or locations. Also, the current art does not allow for multiple users of a computer system, each user having an individual login ID, to save a hibernation file for each user of that system. Further, the current art requires writing a hibernation file to disk storage for hibernation mode to be entered, and requires the user to power off after writing a hibernation file to disk storage.

In general, the current art hibernation mode differs from standby mode in that when standby mode is implemented, the computer system in standby mode requires power to maintain itself, while hibernation mode is used when the computer is powered off. Once the computer is powered on in the current art hibernation mode, all the settings and memory contents are restored to their original state.

SUMMARY OF THE PRESENT INVENTION

The present invention provides a method for extending the hibernation settings of a computer using an operating system (OS) and particularly to functions in the basic input/output system (BIOS) and OS that allow a user to save and restore multiple hibernation files to selectively restore different work environments based on user ID while the computer is already up and running. In a computer operating system wherein active files and programs are saved in disk drive storage when the computer shuts down and restored to the active file and program state when the computer is powered on later, the present invention allows a user to select a hibernation process from several choices, including: setting the hibernation process mode during computer operation prior to shut down to thereby designate all active files and programs for hibernation upon subsequent shut down; and setting the hibernation process mode at shut down to thereby designate active files and programs for hibernation coincident with shut down. This invention allows a user to write several different hibernation files, and to continue using the system after creating a hibernation file. Further, more than one user can share a system and choose from his or her individual hibernation files when powering on the system which are organized within the system by user IDs, thus allowing privacy to all users of the system.

The particular coverage of the present invention allows for quicker shut down of the system during the hibernation process, the ability to save and restore multiple files allowing a user to selectively restore different work environments on the computer system, creation of a hibernation file without powering off the system afterwards, restoration of system in hibernation mode based on a user ID, and restoration of system from a hibernation file while the system is already up and running.

The present invention is particularly useful not only to multiple users of a computer system, but also to one user with multiple files which can each be saved to individual hibernation files.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
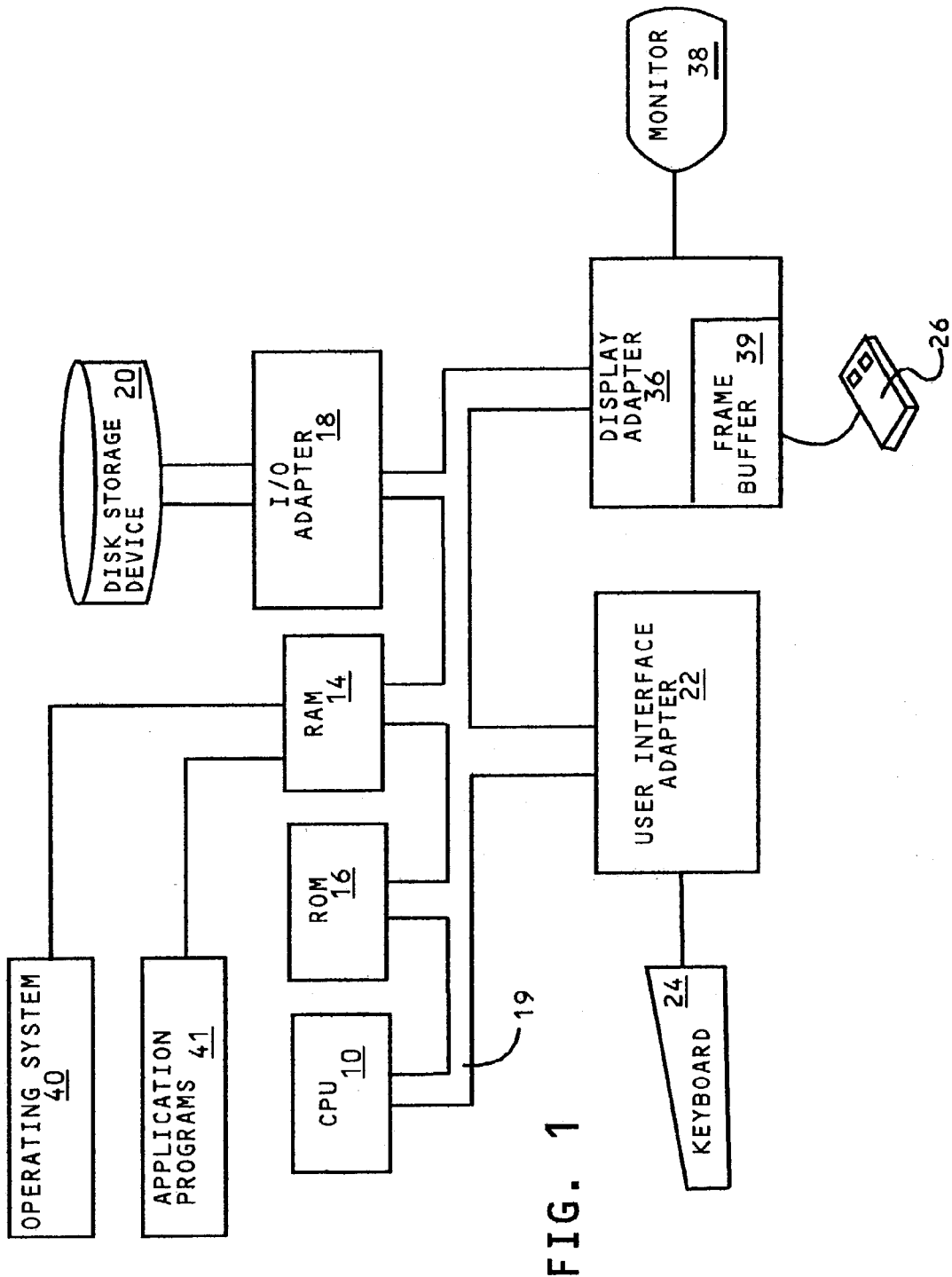
FIG. 1 is a block diagram of a generalized multiprocessor system on which the present invention for advanced computer hibernation functions may be practiced.

Referring to FIG. 1, a generalized system is shown which may function as a basic data processing system on which the present invention may be implemented. A CPU 10 is provided and interconnected to various other components by system bus 19. An operating system 40 runs on a CPU 10, provides control and is used to coordinate the functions of the various components of FIG. 1. Operating system 40 may be one of the commercially available operating systems which is capable of handling multiprocessing, such as IBM's AIX 6000™ operating system or the OS/2™ operating system available from IBM, Microsoft's Windows NT™, as well as other UNIX and AIX operating systems. The operating system is in random access memory (RAM) 14 during the system operations. Application programs 41 controlled by the system are moved into and out of the main memory, RAM 14.

The system shown in FIG. 1 also includes the following conventional elements. A read only memory (ROM) 16 is connected to CPU 10 via system bus 19 and includes the basic input/output system (BIOS) that controls the basic computer functions. RAM 14 and I/O adapter 18 are also interconnected to system bus 19. I/O adapter 18 may be a small computer system interface (SCSI) adapter that communicates with the disk storage device 20. I/O devices are also connected to system bus 19 via user interface adapter 22 and display adapter 36. Keyboard 24 and mouse 26 are all interconnected to bus 19 through user interface adapter 22.

It is through such input devices that the user may interactively relate to the browser and the related programs according to the present invention. Display adapter 36 includes a frame buffer 39, which is a storage device that holds a representation of each pixel on the display screen of the monitor 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 2:
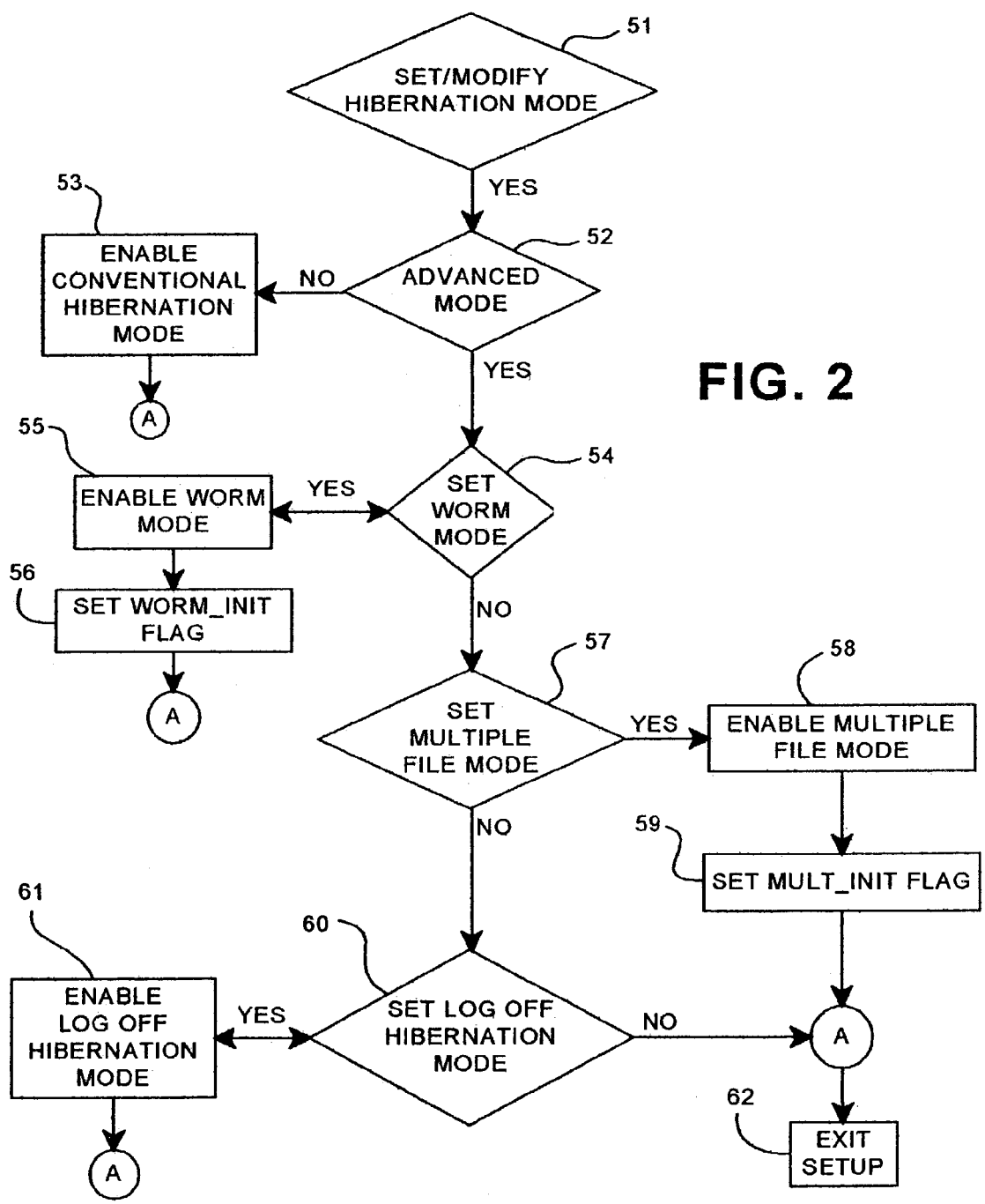
FIG. 2 is a flowchart of the running of a present invention illustrative routine for entering into advanced hibernation process modes.

With reference to FIG. 2, there will be described an overview of the running of a present invention illustrative routine for entering and setting an advanced hibernation mode. While a computer system is powered-on, a user is offered options regarding advanced hibernations modes as follows. Step 51, a user opts to set or modify hibernation mode and is offered a choice between advanced hibernation mode step 52 or conventional hibernation mode step 53. If the user opts to enable the conventional hibernation mode step 53, conventional hibernation mode is set and the setup mode 62 is exited.

A user may need to restore different work scenarios that the user needs to perform at various times and locations, which is not possible via the conventional hibernation mode. Multiple users each with their own login identification code may each want to save one or more hibernation files under their individual login code, which is not possible via the conventional hibernation mode. This feature is ideal for a shared computer situation with several users. The login code only allows access to its corresponding user, thereby keeping each user's files private. Further, the conventional hibernation mode requires a user to power off when entering hibernation mode. The advanced hibernation mode allows a computer to remain powered on after creating and storing hibernation files. The advanced hibernation mode is also valuable to a user who works on different projects on various days of the week and wants to return to a project quickly that has been stored as a file in advanced hibernation mode. When the user logs on to the computer, a menu gives the user his various hibernation files to select from when logging on. The advanced hibernation mode offers a quicker, safer way for a user to return to a file or work environment without having to reload a work scenario once it has been saved into the user's advanced hibernation mode files.

If the user opts to enable the advanced hibernation mode step 52, menu selections are presented to allow the user to customize the hibernation process. Customization menus include Write Once Read Many (WORM) Mode step 54, Multiple File Mode step 57, and Log Off Hibernation Mode step 60. If the user selects WORM Mode step 54, the operating system then enables WORM Mode step 55 by setting the WORM_Init Flag step 56 before Exiting Setup step 62. If the user selects Multiple File Mode step 57, the operating system then enables Multiple File Mode step 58 by setting the Multiple_Init Flag step 59 before Existing Setup step 62. If the user selects Log Off Hibernation Mode step 60, the operating system then enables Log Off Hibernation Mode step 61 before Exiting Setup step 62.

Figure 3:
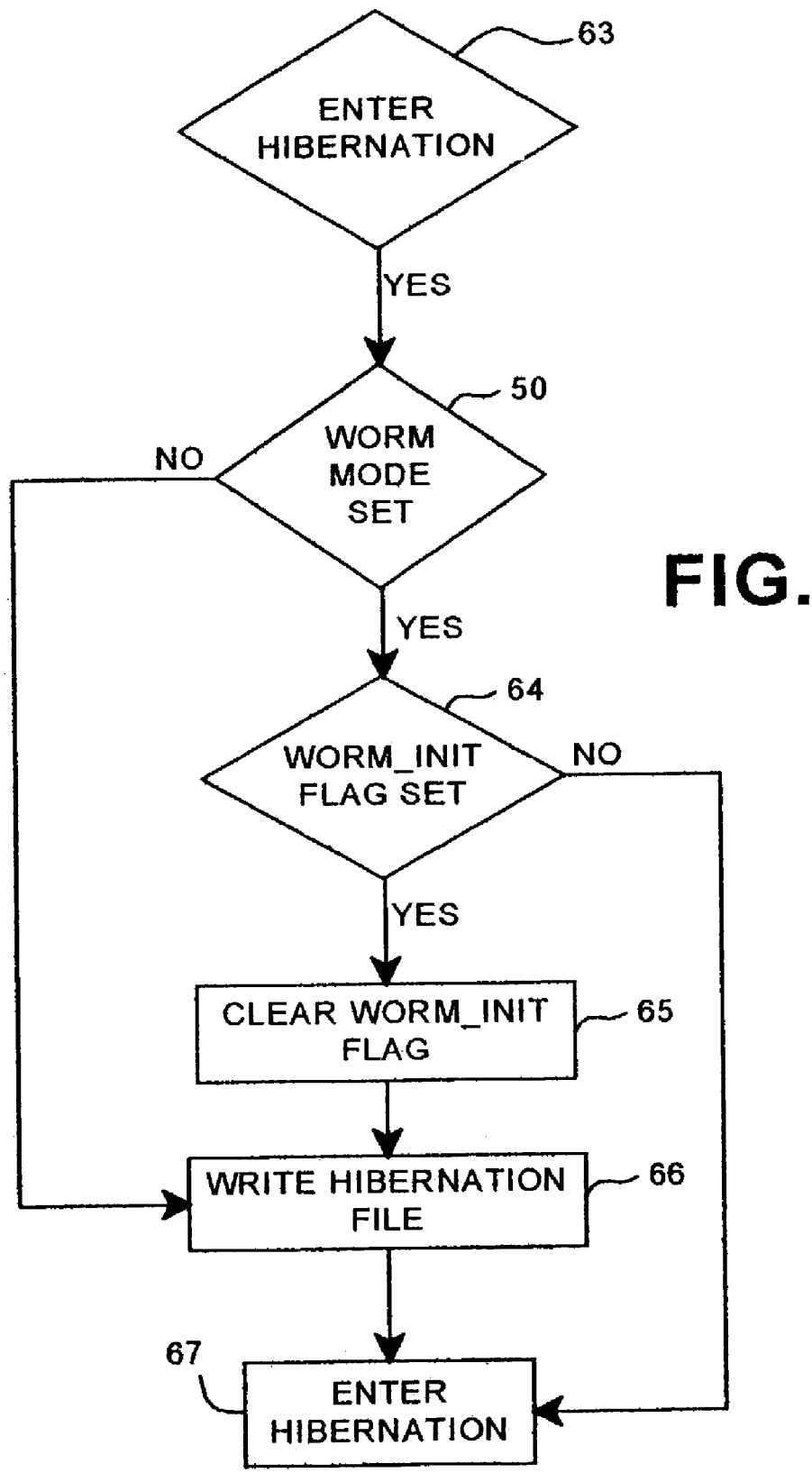
FIG. 3 is a flowchart of the running of a present invention illustrative routine for entering a Write Once Read Many (WORM) hibernation mode.

FIG. 3 shows a more detailed view of entering hibernation in the WORM Mode as follows. A user who previously selected the WORM Mode step 54 (as shown in FIG. 2), the user has the option of whether to Enter Hibernation step 63 or not. If the user opts to Enter Hibernation step 63, the system then determines whether the WORM Mode is set step 50. If the WORM Mode is not set, the system Writes Hibernation File step 66. If the WORM Mode has been set, the system determines whether the WORM_Init Flag is set step 64. If the WORM_Init Flag is not set, the computer system is directed to Enter Hibernation step 67. If the WORM_Init Flag is set, the system must then Clear the WORM_Init Flag step 65. After clearing the WORM_Init Flag, the system must then Write the Hibernation File step 66 before Entering Hibernation step 67. The WORM Mode is used to restore an environment that does not change. Once the initial hibernation file has been created, the WORM Mode allows the computer system to enter hibernation more quickly than the conventional hibernation modes, since it is not necessary for the system in WORM Mode to save the hibernation file to disk prior to shutdown. In WORM Mode, the user never leaves any open files prior to the system entering hibernation mode.

Figure 4:
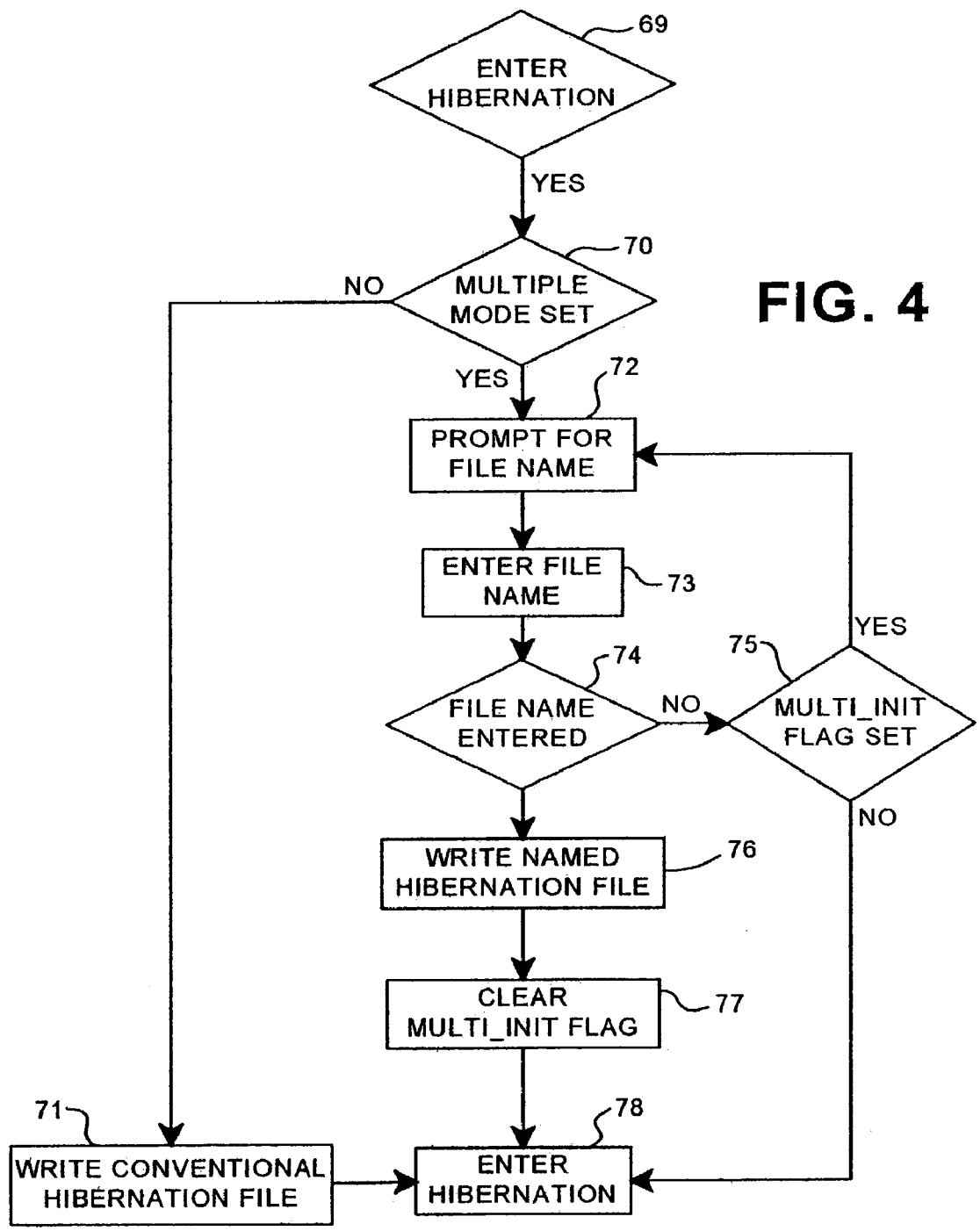
FIG. 4 is a flowchart of the running of a present invention illustrative routine for entering a multiple file hibernation mode.

FIG. 4 shows a more detailed view of entering hibernation in the Multiple File Mode step 57 (as shown in FIG. 2). Step 69, the user Enters Hibernation, and the system determines whether the Multiple File Mode is set step 70. If the Multiple File Mode is not set, the system must Write Conventional Hibernation File step 71 before having the system Hibernate step 78. If the Multiple File Mode is set step 70, the user is then prompted for File Name step 72 and must Enter File Name step 73. If a File Name is not Entered step 74, the system determines whether Multiple_Init Flag is set step 75. If the Multiple_Init Flag is not set, the system then enters Hibernation step 78. If the Multiple_Init Flag is set step 75, the user is prompted for a File Name step 72. Once the user has entered a File Name step 74, the system must Write Named Hibernation File step 76, then Clear Multiple_Init Flag step 77, before entering Hibernation step 78. When the Multiple File Mode is enabled, a user can create multiple hibernation files from which to restore system operation. Also, multiple users can create multiple hibernation files from which to restore system operation.

Figure 5:
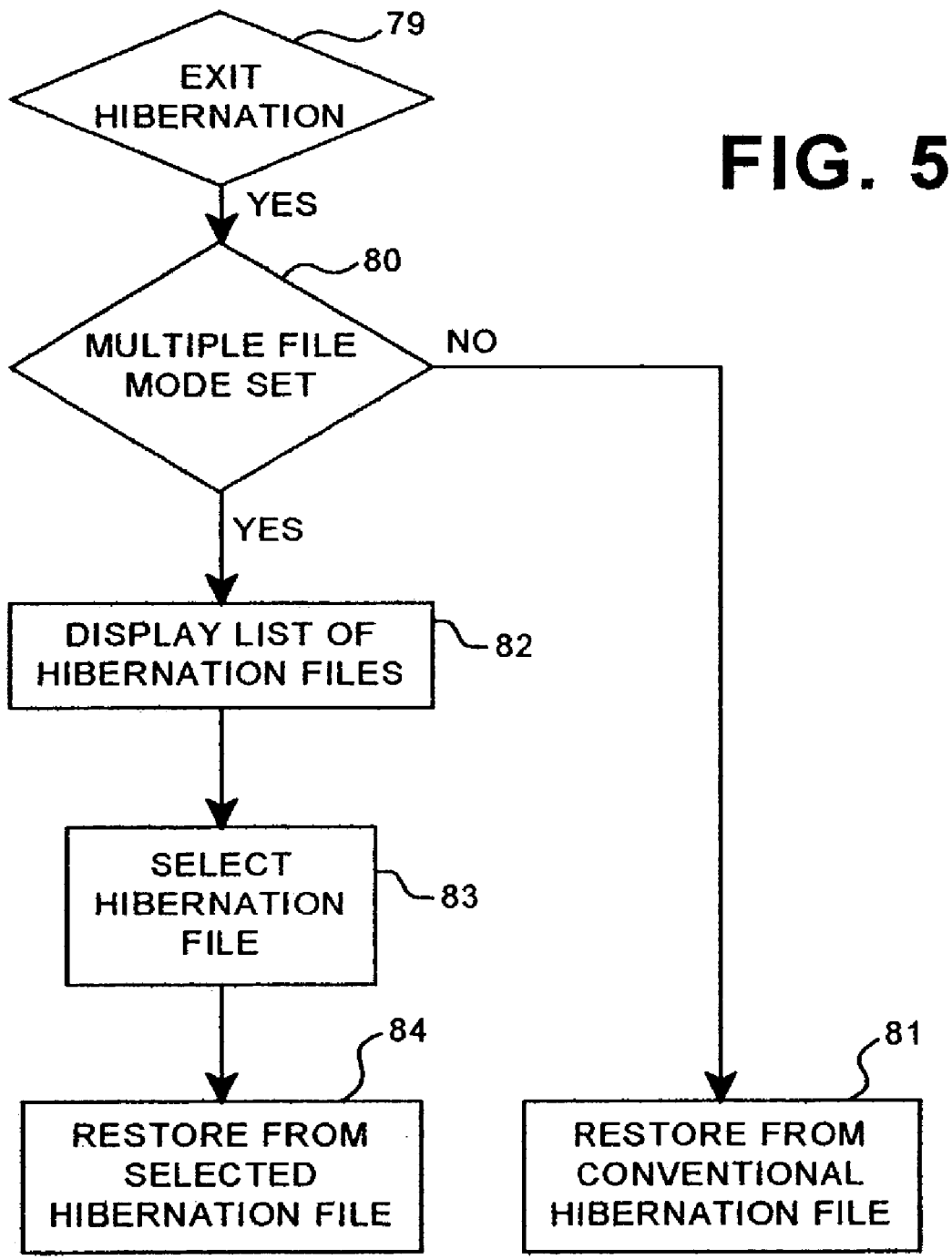
FIG. 5 is a flowchart of the running of a present invention illustrative routine for exiting a multiple file hibernation mode.

FIG. 5 shows a more detailed view of the steps of exiting hibernation from a Multiple File Mode step 57 (as shown in FIG. 2). Step 79, in Exiting Hibernation, the system determines whether a Multiple File Mode is set step 80. Multiple users each with their own login identification code may each want to save one or more hibernation files under their individual login code, which is not possible via the conventional hibernation mode. This feature is ideal for a shared computer situation with several users. The login code only allows access to its corresponding user, thereby keeping each user's files private. Further, the conventional hibernation mode requires a user to power off when entering hibernation mode. The advanced hibernation mode allows a user to remain powered on when creating and storing hibernation files, and when entering advanced hibernation mode. Therefore, user A who is working on a particular file when interrupted by user B sharing the same computer can quickly enter advanced hibernation mode saving user A's file as it is to allow user B access to the computer. When user B is finished using the shared computer, user A can quickly return to user A's file exactly as it was when interrupted by user B.

If a Multiple File Mode is not set, the system Restores From Conventional Hibernation File step 81. If a Multiple File Mode is set step 80, the system Displays a List of Hibernation Files step 82 and prompts the user to Select Hibernation File step 83. Once the Hibernation File is Selected step 83, the system is Restored From Selected Hibernation File step 84. The Multiple File Mode can be used in conjunction with the WORM Mode in that each file of the Multiple File Hibernation Mode can be written in "Write Once Read Many" format which allows the user to enter hibernation quickly.

Figure 6:
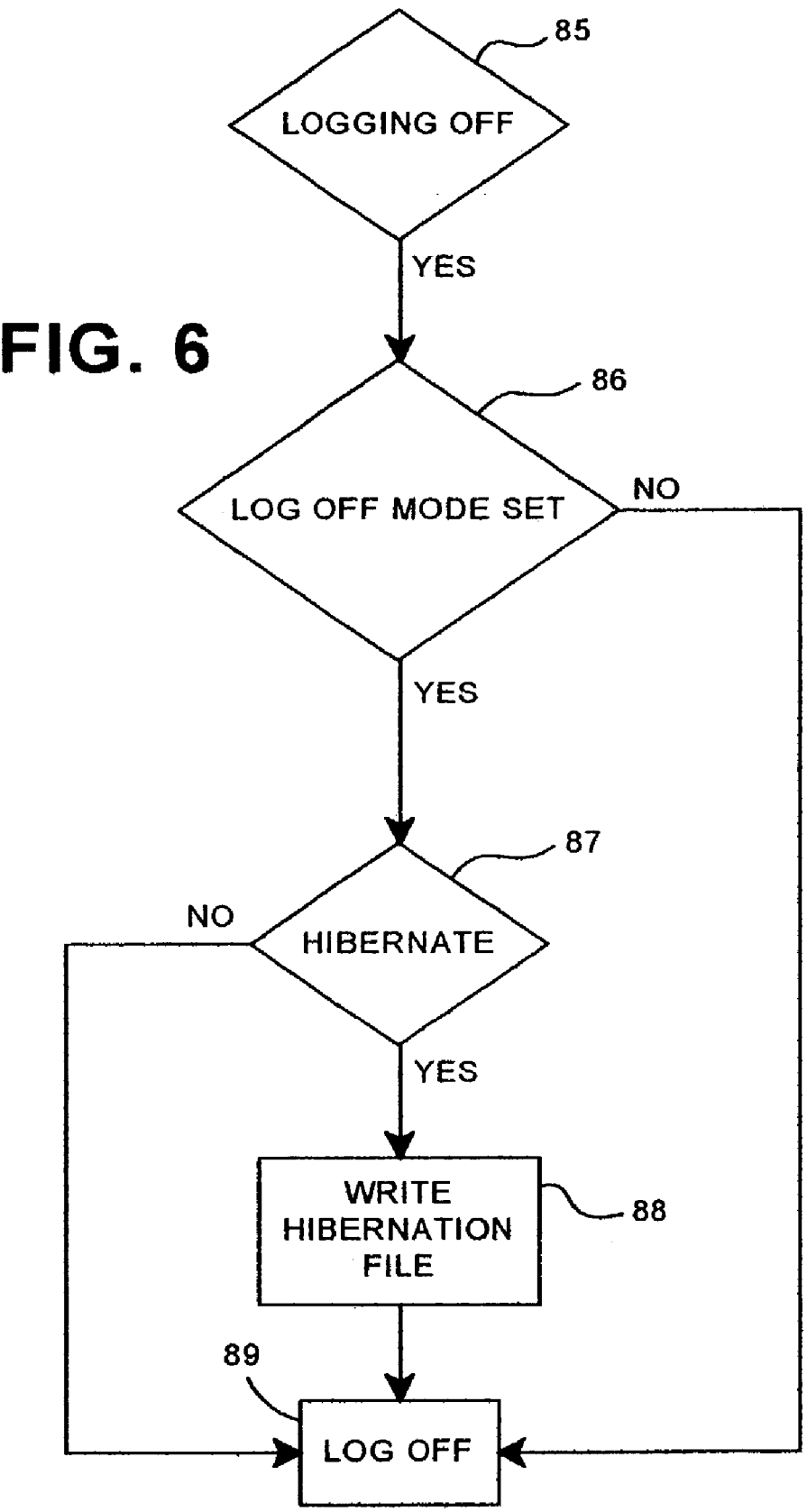
FIG. 6 is a flowchart of the running of a present invention illustrative routine for entering a log off hibernation mode.

FIG. 6 shows a more detailed view of the steps of entering hibernation in Log Off Hibernation Mode step 60 (as shown in FIG. 2). Step 85, in Logging Off, the system determines whether the Log Off Mode is set step 86. If the Log Off Mode is not set, the user is prompted to Log Off step 89. If the Log Off Mode is set step 86, the user is asked whether the system should Hibernate step 87. If the user chooses not to hibernate, the system Logs Off step 89 the user. If the user chooses to Hibernate step 87, the system must Write Hibernation File step 88, before the user is Logged Off step 89. The Log Off Hibernation Mode allows for each user having an account and user ID on the computer the ability to store their individual hibernation files from which to restore system operation. The Log Off Hibernation Mode is particularly useful when a computer is shared by two or more users, since a user can relinquish the computer to other users without having to finish or recreate the user's work environment at a later time. The Log Off Mode can require user ID accounts for access to a user's hibernation files. This feature is especially useful when a system is shared by two or more users as it provides privacy to each user's file while keeping the files organized separately by user ID.

Figure 7:
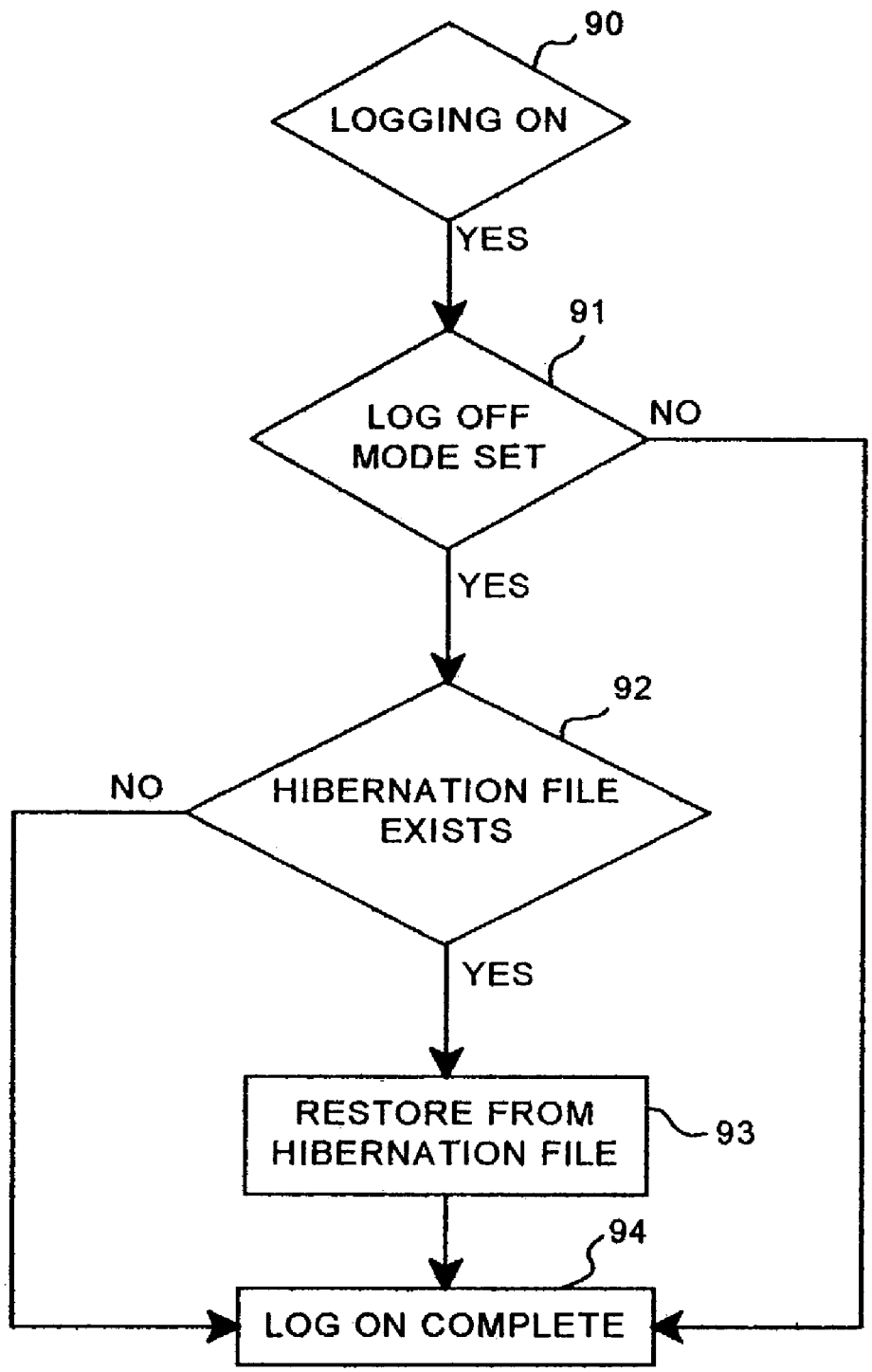
FIG. 7 is a flowchart of the running of a present invention illustrative routine for exiting a log off hibernation mode.

FIG. 7 shows a more detailed view of the steps of exiting hibernation in Log Off Hibernation step 60 (as shown in FIG. 2). Step 90, in Logging On, the system determines whether the Log Off Mode is set step 91. If the Log Off Mode is not set, the user's Log On is Complete step 94. If the Log Off Mode is set step 91, the system determines whether a Hibernation File Exists step 92. If a Hibernation File does not exist, the user's Log On is Complete step 94. If a Hibernation File Exists step 92, the system is Restored From Hibernation File step 93, then the Log On is Complete step 94. The Log Off Hibernation Mode allows a second user access to the system without access to the first user's computing environment, and restores the first user's computing environment when the second user has logged off the system.

One of the preferred implementations of the present invention is an application program 41 made up of programming steps or instructions resident in RAM 14, FIG. 1, during computer operations. Until required by the computer system, the program instructions may be stored in another readable medium, e.g. disk drive 20, or in a removable memory such as an optical disk for use in a CD ROM computer input or in a floppy disk for use in a floppy disk drive computer input. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

The invention claimed is:

1. A method in a computer system including a hibernation mode for stating active files and programs during shut down, comprising the steps of:
    providing a plurality of different hibernation modes, selected from the group consisting essentially of a Write Once Read Many (WORM) Mode, a Multiple File Mode, and a Log Off Hibernation Mode;
    determining when said active files and programs are to be designated for hibernation mode; and
    selecting at least one of said hibernation modes for said active files and programs.

2. The method according to claim 1 wherein said step of determining comprises the steps of:
    designating the active files and programs for hibernation mode prior to shut down of said computer system; and
    storing said designated active files and programs upon subsequent shut down.

3. The method according to claim 1 wherein said step of determining comprises the step of:
    designating the active files and programs for hibernation mode and storing said designated active files and programs coincident with shut down of the computer system.

4. The method according to claim 1 wherein said step of providing a plurality of different hibernation modes comprises the steps of:
    providing a conventional hibernation mode; and
    providing more than one advanced hibernation mode.

5. The method according to claim 4 wherein said step of selecting comprises the step of determining whether said hibernation mode is a conventional hibernation mode or an advanced hibernation mode for storing said active files and programs.

6. The method according to claim 5 wherein said step of selecting a hibernation mode further comprises the step of selecting one of said plurality of different hibernation modes when said hibernation mode is determined to be said advanced hibernation mode.

7. The method according to claim 6 wherein said step of selecting a hibernation mode further comprises the step of selecting a hibernation mode that stores said active files and programs in a format that allows said active files and programs to be unmodified after writing, but read multiple times.

8. The method according to claim 6 wherein said step of selecting a hibernation mode further comprises the step of selecting a hibernation mode that stores multiple ones of said active files and programs for access by multiple users of said computer system.

9. The method according to claim 8 further comprising the steps of:
    prompting said user for a name of said stored active files and programs; and
    entering, by said user identification information associated with said user.

10. A computer operating system including a hibernation mode for storing active files and programs during shut down, comprising:
    means for providing a plurality of different hibernation modes selected from the noun consisting essentially of a Write Once Read Many (WORM) Mode, a Multiple File Mode, and a Log Off Hibernation Mode; means for determining when said active files and programs are to be designated for hibernation mode; and
    means for selecting at least one of said hibernation modes for said active files and programs.

11. The computer operating system according to claim 10 wherein said means for determining further includes:
    means for designating the active files and programs for hibernation mode prior to shut down of said computer system; and
    means for storing said designated active files and programs upon subsequent shut down.

12. The computer operating system according to claim 10 wherein said means for determining further includes:

means for designating the active files and programs for hibernation mode and storing said designated active files and programs coincident with shut down of the computer system.

13. The computer operating system according to claim 10 wherein said means for providing a plurality of different hibernation modes includes:
means for providing a conventional hibernation mode; and
means for providing more than one advanced hibernation mode.

14. The computer operating system according to claim 13 wherein said means for selecting includes the means for determining whether said hibernation mode is a conventional hibernation mode or an advanced hibernation mode for storing said active files and programs.

15. The computer operating system according to claim 14 wherein said means for selecting a hibernation mode further includes the means for selecting one of said plurality of different hibernation modes when said hibernation mode is determined to be said advanced hibernation mode.

16. The computer operating system according to claim 15 wherein said means for selecting a hibernation mode further includes the means for selecting a hibernation mode that stores said active files and programs in a format that allows said active files and programs to be unmodified after writing, but read multiple times.

17. The computer operating system according to claim 15 wherein said means for selecting a hibernation mode further includes the means for selecting a hibernation mode that stores multiple ones of said active files and programs for access by multiple users of said computer system.

18. The computer operating system according to claim 17 further including:
means for prompting said user for a name of said stored active files and programs; and
means for entering, by said user identification information associated with said user.

19. A computer program having code recorded on a computer readable medium for enabling a user to store active files and programs during shut down in hibernation mode, comprising:
means for providing a plurality of different hibernation modes selected from the group consisting essentially of a Write Once Read Many (WORM) Mode, a Multiple File Mode, and a Log Off Hibernation Mode;
means for determining when said active files and programs are to be designated for hibernation mode; and
means for selecting at least one of said hibernation modes for said active files and programs.

20. The computer program according to claim 19 wherein said means for determining includes:
means for designating the active files and programs for hibernation mode prior to shut down of said computer system; and
means for storing said designated active files and programs upon subsequent shut down.

* * * * *